United States Patent
Wang et al.

(10) Patent No.: US 8,353,390 B2
(45) Date of Patent: Jan. 15, 2013

(54) SPLASH SHIELD FOR BRAKE CORNER ASSEMBLY

(75) Inventors: Wenshui Wang, Shanghai (CN); Robert G. Sutherlin, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 366 days.

(21) Appl. No.: 12/720,981

(22) Filed: Mar. 10, 2010

(65) Prior Publication Data
US 2011/0221142 A1 Sep. 15, 2011

(51) Int. Cl.
*F16D 55/00* (2006.01)
(52) U.S. Cl. .................. 188/71.1; 188/73.1; 301/108.1
(58) Field of Classification Search ............. 188/71.1, 188/73.1; 277/634–636; 280/93.152; 301/37.31, 301/37.103, 105.1, 108.1
See application file for complete search history.

(56) References Cited

U.S. PATENT DOCUMENTS

| | | | | |
|---|---|---|---|---|
| 4,179,167 | A | * | 12/1979 | Lura et al. ...................... 384/512 |
| 5,011,233 | A | * | 4/1991 | Nomura et al. ............. 301/108.1 |
| 5,852,361 | A | * | 12/1998 | Ouchi et al. .................. 324/174 |
| 6,464,399 | B1 | * | 10/2002 | Novak et al. .................. 384/477 |
| 6,883,816 | B2 | * | 4/2005 | Baker et al. ............. 280/93.512 |
| 7,934,732 | B1 | * | 5/2011 | Kinney et al. ............ 280/93.512 |
| 2008/0170817 | A1 | * | 7/2008 | McDearmon ................. 384/448 |
| 2008/0252030 | A1 | * | 10/2008 | Gradu et al. ............. 280/93.512 |
| 2010/0285890 | A1 | * | 11/2010 | Dougherty et al. ........... 464/137 |

FOREIGN PATENT DOCUMENTS
EP       1950435 A1 *   7/2008

\* cited by examiner

*Primary Examiner* — Pamela Rodriguez

(57) ABSTRACT

A brake corner assembly includes a steering knuckle fixed against rotation, a rotary member including a outer surface, and a shield secured to the steering knuckle and including a ring including a sealing surface located adjacent to the outer surface, the sealing surface having a first diameter that is substantially equal to a second diameter of a portion of the outer surface that is adjacent to the sealing surface.

20 Claims, 2 Drawing Sheets

SPLASH SHIELD FOR BRAKE CORNER ASSEMBLY

BACKGROUND OF INVENTION

This invention relates generally to a brake corner and halfshaft, and more particularly to protecting the wheel bearing and other components against entry of foreign material.

A wheel speed sensor produces a signal representing wheel speed, which is supplied as input to an electronic control unit. Such sensors, which are mounted at a wheel bearing assembly, are susceptible to debris impingement and damage due to the foreign matter from the road surface that accumulates on the magnetic encoder.

A seal or shield, particularly one made of steel or another metal, can produce noise between a rotating part of the brake corner assembly and a stationary steering knuckle. To avoid the noise, a metal shield would need a gap with the rotating part, which will reduce the effectiveness of the shield.

A need exists in the industry for a seal or shield that prevents or limits entry of foreign matter to the interior of a brake corner assembly where the bearings and speed sensor are located. Preferably the shield would be easily and quickly installed on the steering knuckle with a light force producing an interference fit. The shield should avoid or minimize frictional drag between the shield and a rotating halfshaft that transmits power to a wheel hub. The frictional drag will be reduced to effectively zero as the rubber lip is worn to a net fit with the rotating part. The shield should be produced and installed at low cost.

SUMMARY OF INVENTION

A brake corner assembly includes a steering knuckle fixed against rotation, a rotary member including an outer surface, and a shield secured to the steering knuckle and including a ring having a sealing surface located adjacent to the outer surface, the sealing surface having a first diameter that is substantially equal to a second diameter of a portion of the outer surface that is adjacent to the sealing surface.

The shield and seal are easily secured to the steering knuckle with an interference fit and are produced and installed reliably at low cost. A groove on the surface of a constant velocity joint closely fits the seal ring with a gap that is preferably equal to or less than 0.100 mm, thereby avoiding noise and excessive drag on the seal.

Wheel stud in the brake corner assembly can be used to retain positively the splash shield in a correct axial and angular position.

The shield protects an inboard wheel bearing and a wheel speed sensor from damage due to foreign matter such as water, sand, dirt and hard objects. When the seal ring slides on an adjacent surface with a light interference, no excessive noise is produced.

The scope of applicability of the preferred embodiment will become apparent from the following detailed description, claims and drawings. It should be understood that the description and specific examples, although indicating preferred embodiments of the invention, are given by way of illustration only. Various changes and modifications to the described embodiments and examples will become apparent to those skilled in the art.

DETAILED DESCRIPTION

Figure 1:
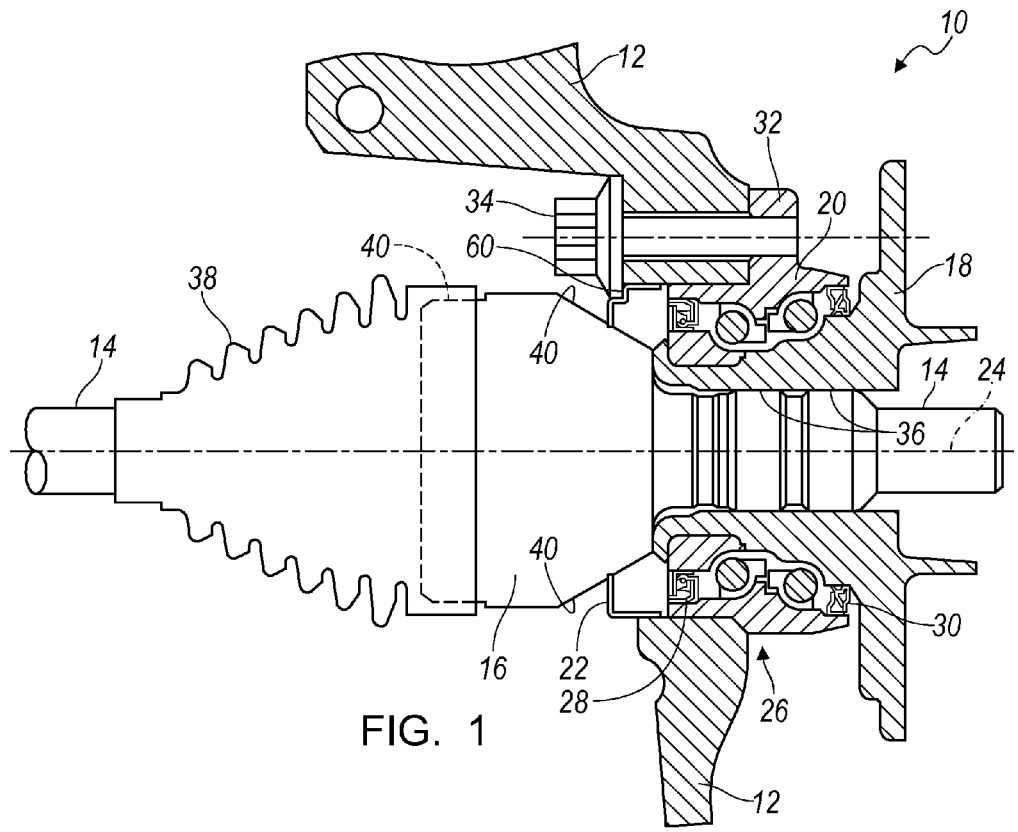
FIG. 1 is a cross section taken at a diametric plane through a brake corner assembly that incorporates a shield.

Referring now to the drawings, FIG. 1 shows a brake corner assembly 10, which includes a fixed or stationary member 12, such as a steering knuckle; a rotary member 14, such as a halfshaft, to which is attached a constant velocity joint (CVJ) 16; a wheel hub 18; an outer member 20; and a shield 22.

The wheel hub 18 is supported for rotation about a central axis 24 on a bearing 26. Dynamic seals 28, 30 located at axially opposite sides of bearing 26 retain bearing lubricant, such as grease, within bearing 26. The outer race of bearing 26 is the inner surface of the outer member 20; the inner race of the bearing is the outer surface of the wheel hub 18.

The outer member 20 includes a flange 32, which is secured to the knuckle 12 by a series of bolts 34 spaced angularly about axis 24. The steering knuckle 12 is secured to the vehicle chassis by bolts, and the shield 22 is secured to the steering knuckle 12.

Figure 2:
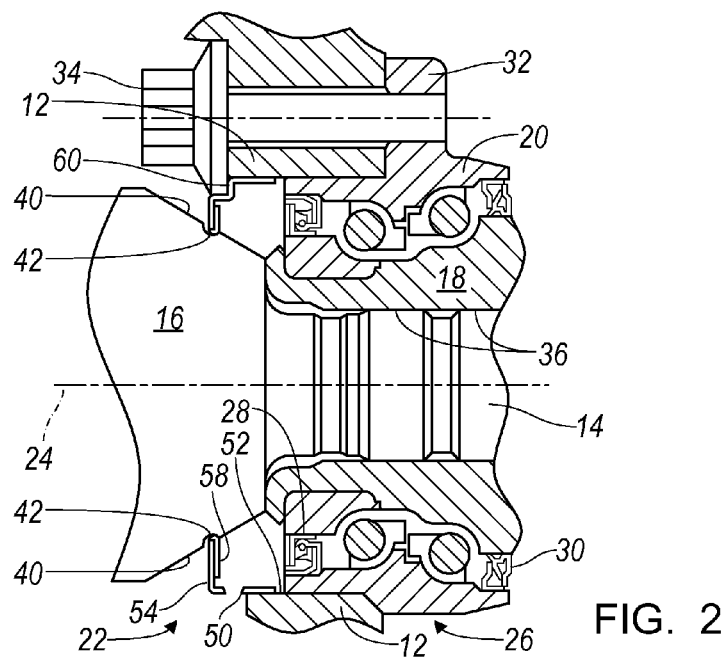
FIG. 2 is a cross section similar to that of FIG. 1 but showing an enlarged area in greater detail.

Referring now to FIGS. 1 and 2, the CVJ 16 is secured by axial splines 36 to the wheel hub 18 such that the wheel hub 18 and CVJ 16 rotate as a unit. A flexible, pleated rubber boot 38 is secured at its outboard end to the surface of the CVJ 16 by a strap 40 and at its inboard end to the halfshaft 14. An outer surface 40 of CVJ 16 is conical and formed with a groove 42 located adjacent to shield 22.

Figure 3:
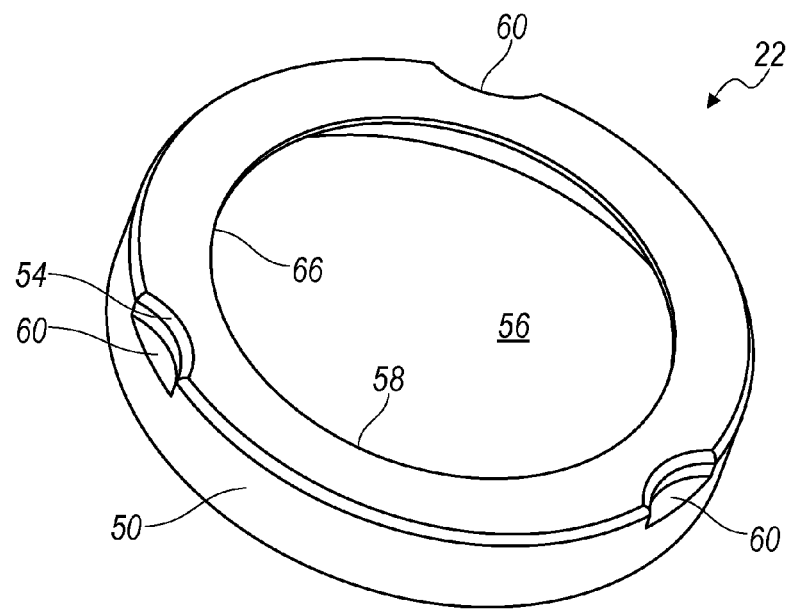
FIG. 3 is a perspective view of the shield showing the seal ring supported on the body of the shield.

As FIGS. 2 and 3 show, the shield 22 includes an axially directed circular cylindrical outer surface 50, which is secured by an interference fit to the inner cylindrical surface 52 of the knuckle 12. A circular support surface 54, located in a plane that is normal to axis 24, surrounds a central circular opening 56. A seal ring 58 is secured to the support surface 54. The shield 22 is formed with three or four angularly spaced recesses 60, which are engaged by the head of the three or four bolts 34 that secure the knuckle 12 to the flange 32 of the outer member 20, thereby retaining the shield 22 in its proper axial and angular position on the knuckle 12. Preferably, the seal ring 58 is made of an elastomer. The shield 22 may be of stamped metal, rubber or injection molded plastic.

Figure 4:
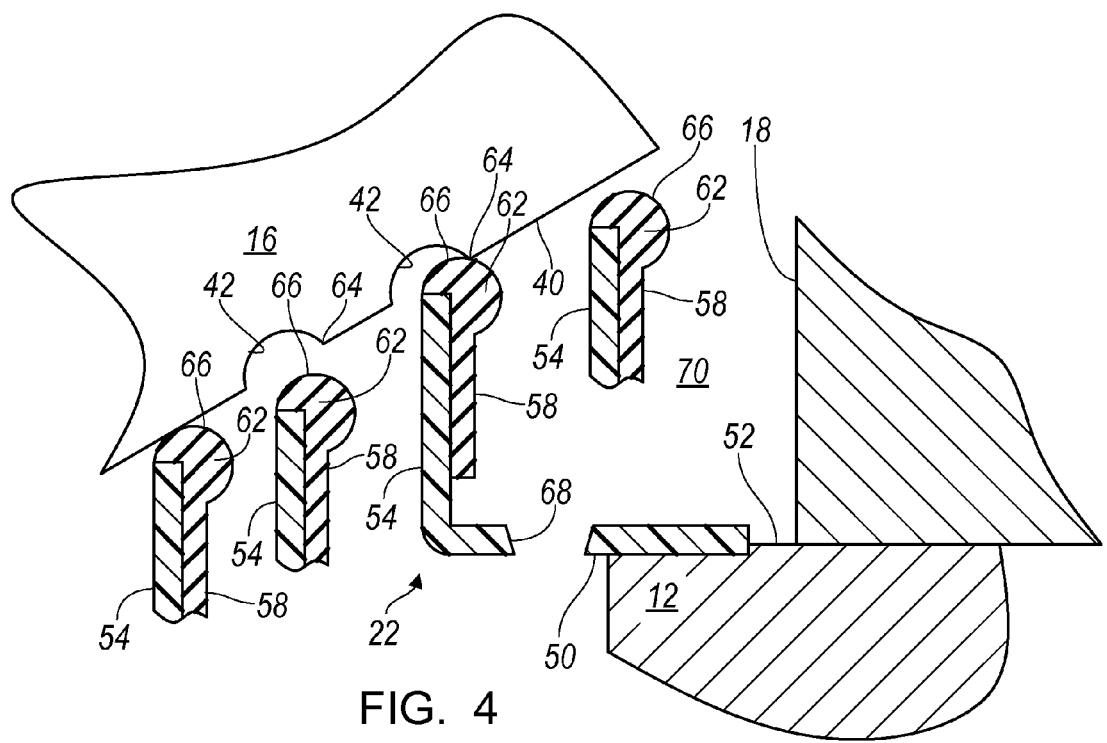
FIG. 4 is a cross section showing the shield forming a seal in sliding contact with, and with a narrow gap from the constant velocity joint.

As FIGS. 2-4 illustrate, the seal ring 58 is in the form of a circular disc, whose radially inner end is formed with a bulb 62 (shown in FIG. 4), which protrudes into the groove 42 of the CVJ 16. In one embodiment, the bulb 62 produces a light interference at the edge 64 formed by the groove 42 and surface 40. At that location, the bulb 62 has a diameter that is substantially equal to the diameter of the edge 64. If the groove 42 is not formed in the CVJ, the sealing surface 66 of the seal ring 58 that is adjacent to the surface 40 of CVJ 16 has a diameter that is substantially equal to the outside diameter of the conical surface 40 that is adjacent to the bulb's sealing surface 66. A drain hole 68 is formed preferably through the thickness of the cylindrical outer surface 50 of the shield 22, thereby providing an opening through which contaminants can exit the space between surface 40 and the bearing 26.

Seals are classified as having light, medium and heavy interference fit according to the degree of its contact with the surface of an adjacent or mating part, or the dimension of a gap between the seal and the adjacent surface. The sealing surface 66 of the bulb 62 may contact the edge 64 or the outer surface 40 with sliding contact having a light interference of less than 0.2 mm. Alternatively, the sealing surface 66 of the bulb 62 may be spaced from the edge 64 or the outer surface 40, producing a slight clearance or gap whose width is less than 1.5 mm. In either case, the sealing surface 66 of the bulb 62 and the edge 64 or the outer surface 40 of the CVJ 16 produce a seal that limits passage of foreign material, such as sand, dirt, water, etc. past the seal.

While certain embodiments of the present invention have been described in detail, those familiar with the art to which this invention relates will recognize various alternative designs and embodiments for practicing the invention as defined by the following claims.

What is claimed is:

1. A brake corner assembly comprising:
a steering knuckle fixed against rotation;
a wheel hub;
a halfshaft rotatably secured to the wheel hub and including an outer surface;
a shield secured to the steering knuckle and including a sealing surface located adjacent to the outer surface, the sealing surface having a first diameter that is substantially equal to a second diameter of a portion of the outer surface that is adjacent to the sealing surface; and
the shield including a support secured by fasteners to the steering knuckle and having an opening though which the halfshaft extends, a seal ring secured to the support, and a sealing surface on the seal ring facing the outer surface.

2. The assembly of claim 1, wherein the sealing surface engages the outer surface with a light interference fit.

3. The assembly of claim 1, wherein:
the outer surface is conical and formed with a groove; and
the sealing surface is in sliding contact with an edge of the groove, thereby sealing a space between the steering knuckle and the rotary member.

4. The assembly of claim 1, wherein:
the outer surface is conical and formed with a groove; and
the sealing surface is spaced by a gap from the outer surface.

5. The assembly of claim 1, wherein:
the outer surface is conical; and
the sealing surface is in sliding contact with the outer surface.

6. The assembly of claim 1, wherein:
the outer surface is conical; and
the sealing surface is spaced by a gap from the outer surface.

7. The assembly of claim 1, further comprising an inner member releasably secured to the steering knuckle and formed with an outer race for supporting a bearing thereon.

8. The assembly of claim 1, wherein:
the steering knuckle includes a radially inner circular cylindrical surface extending along an axis; and
the shield includes a circular cylindrical surface secured to the steering knuckle with an interference fit, the support is located in a plane that intersects the axis.

9. A brake corner assembly comprising:
a steering knuckle fixed against rotation;
a halfshaft supported for rotation on a bearing about an axis including a outer surface that extends into the steering knuckle; and
a shield secured by fasteners to the steering knuckle and having an opening though which the halfshaft extends, the shield including a relatively rigid support surface that extends radially from the steering knuckle toward the outer surface, and a ring secured to and extending from the support surface toward the outer surface, the ring including a relatively flexible, elastic sealing surface located adjacent to the outer surface, the sealing surface and outer surface forming a seal that limits passage of foreign matter toward the bearing.

10. The assembly of claim 9, wherein:
the outer surface is conical and formed with a groove; and
the sealing surface is in sliding contact with an edge of the groove, thereby sealing a space between the steering knuckle and the rotary member.

11. The assembly of claim 9, wherein:
the outer surface is conical and formed with a groove; and
the sealing surface is aligned with the groove and is spaced by a gap from the outer surface.

12. The assembly of claim 9, wherein:
the outer surface is conical; and
the sealing surface is in sliding contact with the outer surface.

13. The assembly of claim 9, wherein:
the outer surface is conical; and
the sealing surface is spaced by a gap from the outer surface.

14. The assembly of claim 9, further comprising an inner member releasably secured to the steering knuckle and formed with an outer race for supporting the bearing thereon.

15. The assembly of claim 9, wherein:
the steering knuckle includes a radially inner circular cylindrical surface extending along an axis; and
the shield includes a circular cylindrical surface secured to the steering knuckle with an interference fit, the support surface is located in a plane that intersects the axis.

16. A brake corner assembly comprising:
a steering knuckle fixed against rotation and including a concave surface extending along an axis;
a halfshaft supported for rotation on a bearing about the axis including a outer surface; and
a shield including a support secured by fasteners to the steering knuckle, the support including a convex surface secured to the concave surface by an interference fit, extending radially from the steering knuckle toward the outer surface, and a ring having an opening though which the halfshaft extends, secured to and extending from the convex surface toward the outer surface, the ring including a relatively flexible, elastic sealing surface located adjacent to the outer surface, the sealing surface and outer surface forming a seal that limits passage of foreign matter toward the bearing.

17. The assembly of claim 16, wherein:
the outer surface is conical and formed with a groove; and
the sealing surface is in sliding contact with an edge of the groove, thereby sealing a space between the steering knuckle and the halfshaft.

18. The assembly of claim 16, wherein:
the outer surface is conical and formed with a groove; and
the sealing surface is spaced by a gap from the outer surface.

19. The assembly of claim 16, wherein the sealing surface is in sliding contact with the outer surface.

20. The assembly of claim 16, wherein the sealing surface is spaced by a gap from the outer surface.

* * * * *